United States Patent [19]

Hooykaas

[11] Patent Number: 5,372,729
[45] Date of Patent: Dec. 13, 1994

[54] METHOD FOR FIXING WASTE MATERIAL

[75] Inventor: Carel W. J. Hooykaas, Rotterdam, Netherlands

[73] Assignee: Pelt & Hooykaas B.V., Rotterdam, Netherlands

[21] Appl. No.: 992,118

[22] Filed: Dec. 17, 1992

[30] Foreign Application Priority Data

Dec. 19, 1991 [NL] Netherlands .................. 9102131

[51] Int. Cl.$^5$ ..................... C02F 1/58; C02F 1/62
[52] U.S. Cl. .................... 210/751; 210/901; 210/660; 588/252; 588/256; 588/257
[58] Field of Search ............ 210/751, 660, 663, 688, 210/690, 691, 692, 693, 694, 901; 588/257, 256, 252

[56] References Cited

U.S. PATENT DOCUMENTS

| | | | |
|---|---|---|---|
| 4,116,705 | 9/1978 | Chappel | 106/90 |
| 4,127,001 | 11/1978 | Tomic | 405/261 |
| 4,377,483 | 3/1983 | Yamashita et al. | 210/751 |
| 4,404,105 | 9/1983 | Rysman de Lockerente | 210/710 |
| 4,473,477 | 9/1984 | Beall | 210/751 |
| 4,518,508 | 5/1985 | Conner | 210/751 |
| 4,650,590 | 3/1987 | Beall | 210/751 |
| 4,762,623 | 8/1988 | Kapland | 210/751 |
| 4,855,083 | 8/1989 | Kagawa et al. | 210/751 |
| 4,931,139 | 6/1990 | Phillips | 162/189 |
| 5,028,338 | 7/1991 | Hooykaas | 210/751 |
| 5,087,375 | 2/1992 | Weinwurm | 210/751 |
| 5,098,612 | 3/1992 | Rowsell | 210/751 |

FOREIGN PATENT DOCUMENTS

| | | |
|---|---|---|
| 899598 | 5/1984 | Belgium . |
| 0389410 | 11/1990 | European Pat. Off. . |
| 388113 | 1/1924 | Germany . |
| 620293 | 10/1935 | Germany . |
| 2228917 | 1/1974 | Germany . |
| 2217316 | 10/1989 | United Kingdom . |

OTHER PUBLICATIONS

Chem. Abstr. vol. 99, No. 12, 1983 nr. 9289bs.

*Primary Examiner*—Cynthia L. Nessler
*Attorney, Agent, or Firm*—Levine & Mandelbaum

[57] ABSTRACT

The invention relates to a method for fixing toxic or nontoxic waste material, in which method the waste material is allowed to absorb into an organic absorbent, the waste material-containing absorbent thus obtained is treated with an occluding agent and the resulting product is mixed with a hydraulic binder and a hardening activator in order to form a cement matrix. The occluding agent used in preferably a silicon compound, such as silica gel or water glass, or a silicon polymer which can be formed from granulated blast furnace slags. The absorbent used can be an organo-clay compound and/or cellulose. The invention also relates to a composite kit for fixing waste material, comprising an absorbent, a hydraulic binder and an occluding agent.

6 Claims, No Drawings

METHOD FOR FIXING WASTE MATERIAL

BACKGROUND OF INVENTION

1) Field of the Invention

The present invention relates to a method for fixing toxic or nontoxic waste material by allowing the waste material to absorb on an organic absorbent and mixing the waste material-containing absorbent thus obtained with a hydraulic binder and a hardening activator to form a hard material.

2) Description of the Prior Art

A method of this type is disclosed in Netherlands Patent Application No. 8901240.

According to this known method, organic waste is allowed to absorb into a modified variety of clay and the product obtained is mixed with Portland cement and fly ash to form a hard end product which has the characteristics of hardened concrete.

Although this known method gives good results when the waste material has an organic matter content of up to about 4%, it has been found that in the presence of higher percentages, the organic compounds present problems because they counteract the cement reaction, as a result of which an end product is formed which is less hard and from which the fixed material can be leached out more rapidly.

Moreover, it has been found that clay can be broken down during the cementation because the aluminum components of clay can dissolve as a result of the basic medium formed by the cement.

Another problem is to be ascribed to the fact that usually not only organic compounds are present in the waste material, but also inorganic compounds, such as, for example, heavy metals. Inorganic substances, are, however, not always bound by a clay. In order to overcome this, it is known to add an additive suitable for the relevant inorganic material, as a result of which the material is precipitated and thus can be incorporated in the cement matrix to be formed.

Because the end product formed behaves like a hardened concrete, it can, however, erode or disintegrate in the course of time. One problem which concrete is known to have is that it disintegrates in the course of time under the effect of frost/thaw. Care must then also be taken that frost/thaw cannot exert any influence, for example by covering the material with a layer of leaf mould. This also applies in the case of the concrete-like end product which is obtained as has been described above. This known end product can therefore also not be used in bridge piers and the like, but can only be dumped, or is used as foundation material.

SUMMARY OF INVENTION

The present invention now provides

A method which completely overcomes the problems outlined above and provides a product which, even when cracking occurs as a result of erosion or mechanical effects, continues to offer protection against leaching out and is suitable for all types of contaminated waste material.

The method of the invention is consequently characterised in that the waste material-containing absorbent is treated with an occluding agent before adding the hydraulic binder and the hardening activator.

The result of this treatment is that the waste material-containing absorbent is coated with the occluding agent, as a result of which, in the finished end product, the waste material is not only contained in the cement matrix but is also surrounded by the occluding agent. In this way an extra barrier is formed, as a result of which leaching out is virtually impossible. Of course, it is preferred if the waste material-containing absorbent to be treated with the occluding agent is treated in the form of particles, so that the surface area of the waste material-containing absorbent treated with the occluding agent is sufficiently large.

It is pointed out that the absorption of the organic constituents in the absorbent, for example an organo-clay compound, can be such that these constituents are not only able to adhere in the internal cavities of this absorbent but are also able to adhere on the external surface thereof. Thus, it is possible that, depending on the size of the particular molecules, some molecules are contained in the interior cavity of the absorbent while the remaining molecules, from the absorbent, as it were at least partially cover the outside thereof and in fact form a thin film thereon.

Although an adhesion of this type, in the form of a thin film, can be less than in the case of absorption in the interior cavities of the absorbent, the binding strength between the material to be absorbed and the absorbent is less relevant, because the waste material-containing absorbent according to the invention is coated with an occluding agent.

The treatment with the occluding agent also offers the great advantage that the organic compounds to be fixed can be absorbed in an organo-clay compound without it being necessary to take into account that the clay compound used can be broken down by the hydraulic binder used in a later stage. Adjustment of the pH of the medium formed is then also necessary only for the subsequent cementation.

Expediently, the skin formed with the occluding agent is indeed impenetrable to the hydraulic binder, but the occluding agent must allow the particles coated therewith to be able to be incorporated in a cement matrix, of course without the occluding agent being attacked.

Preferably, the silicon compound used is a silicon polymer, silica gel or water glass. Of course, this list is not limiting and other silicon compounds, such as silanes and silicones, can also be used.

According to one embodiment, which is to be particularly preferred, the silicon polymer is formed in situ, in particular by reaction of granulated blast furnace slags with a strong acid, such as sulphuric acid. In order to obtain rapid polymerisation of the calcium aluminosilicate present in these slags, it is advisable to adjust the pH of the mixture to a value which is higher than 3 and preferably about 5.

It is pointed out that it is known per se to add water glass in an immobilisation process or to form a silicon polymer in situ. However, in such a case the waste material to be treated is chemically or physically bound in a silicon matrix. However, no absorption onto an absorption agent takes place in a "glassification" process of this type, while, moreover, an intimate mixing of the constituents present takes place. According to the invention, on the other hand, only a skin of occluding agent around the waste material-containing absorbent is formed with the silicon compound.

For explanation of known glassification processes, reference may be made to British Patent No. 1,518,024 and the corresponding U.S. Pat. No. 4,404,105.

It is pointed out that waste material is understood to be any material which is formed as a by-product from an industrial process and may have an adverse effect on the environment if it is discarded without treatment. Preferably, the method under consideration is carried out at ambient temperature. This implies a wide margin and therefore makes it possible to treat the waste material at source, as a result of which transport costs can be dispensed with.

Although an unmodified or modified clay has always been mentioned above as absorbent, it is possible, according to an expedient variant of the present invention, entirely or partially to replace the organo-clay compound used by cellulose.

As the waste material to be fixed, which is absorbed in an absorbent, is coated with an occluding agent before the whole is enclosed in a cement matrix, it will be obvious to a person skilled in the art that, in principle, a large number of absorbents can be used and the invention does not have to be restricted to the use of a clay compound and/or cellulose.

It is also pointed out that because the demands with respect to the treatment of industrial waste are becoming ever more stringent, the provision of a process which offers a complete guarantee against leaching out during storage merits the highest priority. At present, contaminated industrial waste material is dumped untreated in a so-called $C_2$ dump, but this is expensive. If the waste has been treated and complies with specific standards with respect to leaching out, it can, on the other hand, be dumped in a $C_3$ dump, this type of storage currently being 4 times cheaper than that in a $C_2$ dump. An additional requirement for admission to a $C_2$ dump is, however, that the waste submitted must not dust and must be puncture-resistant, whilst, in addition, all liquid waste is prohibited.

This problem is completely overcome with the aid of the method according to the invention. In addition, the product obtained according to the invention can be used for complete or partial replacement of concrete, because, as a result of the presence of both the cement matrix and the occluding agent, the product offers a double guarantee against leaching out.

Finally, another aim of the invention is to provide a composite kit, which is particularly suitable for fixing toxic or non-toxic, particulate or liquid waste material, comprising an absorbent and a hydraulic binder, which kit is characterised in that it also comprises an occluding agent.

Preferably, the occluding agent is a silicon compound, in particular a silicon polymer, silica gel or water glass, the silicon compound expediently comprising granulated blast furnace slags.

DETAILED DESCRIPTION OF INVENTION

EXAMPLE 1

A montmorillonite clay in the form of a bentonite clay was finely ground to a particle size of about 200 mesh. This finely ground bentonite clay was then treated with a slurry of industrial waste which essentially contained inorganic constituents, in particular heavy metals such as arsenic, antimony, tin, copper, lead and mercury, and only a small fraction of organic substances, mainly phenol.

The amount of clay used was determined beforehand on a laboratory scale, such that essentially all contaminants could be absorbed or enclosed in the clay used. If desired, the amount of water present in the slurry of industrial waste material was adjusted so as to be able to obtain an essentially granular product after the absorption step.

The absorbent containing contaminants which was obtained in this way was then mixed with approximately 2% of sodium silicate in the form of a solution.

An aqueous slurry was then formed by mixing 20 kg of particles, obtained as described above, with 40 kg of Portland cement and 40 l of water, after which 10 kg of fly ash were added.

The resulting mixture was allowed to harden for 28 days.

Neither the heavy metals nor the phenol could be detected by extraction from the hardened material obtained.

For comparison, the above experiment was repeated except for the addition of the sodium silicate solution. The material thus obtained, after hardening for 28 days, had unacceptedly high leaching values in diverse leaching tests, both with respect to the heavy metals and to the organic material.

EXAMPLE 2

A clay modified with a quaternary ammonium compound is preferably used for the treatment of industrial waste material which has an organic substance content of more than 4%. In the present example, the waste stream contained about 7% of organic substances, mainly phenol and chloronaphthalene. After the treatment with sodium silicate, followed by mixing with Portland cement and fly ash in accordance with Example 1, a hardened material is obtained from which it was not possible to extract phenol and chloronaphthalene.

This hardened material is therefore particularly suitable for raising and filling up, or filling in, ground areas, without it being possible for there to be a risk of leaching in a later stage.

By repeating the above treatment but omitting the sodium silicate solution, a hardened material was obtained from which it was possible to leach out the organic substances to values above the currently admissible limit.

EXAMPLE 3

Example 1 was repeated except that, instead of sodium silicate, granulated blast furnace slags were used, from which a silicon polymer was formed by adding strong acid, for example sulphuric acid, until a pH of about 5 was obtained.

The hardened material obtained after mixing with Portland cement and fly ash in accordance with Example 1 complies with the IBC regulations which apply for a $C_3$ dump.

It is pointed out that using cellulose as absorbent, it was possible to obtain the same results as described in Examples 1, 2 and 3, using modified or unmodified clay. However, the use of cellulose has the advantage that it is a much more inexpensive material than clay.

What is claimed is:

1. In a method for fixing toxic or nontoxic waste material by allowing the waste material to absorb on an organic absorbent to form a waste material-containing absorbent and mixing the waste material-containing absorbent with a hydraulic binder and a hardening activator to form a hard material, the improvement comprising coating the waste material-containing absorbent with an occluding agent, before mixing the waste material with a hydraulic binder and hardening activator.

2. Method according to claim 1, wherein the occluding agent used is a silicon compound.

3. Method according to claim 1, wherein the occluding agent is a silicon compound in the form of a silicon polymer, silica gel or water glass.

4. Method according to claim 1, wherein the occluding agent is a silicon polymer obtained from granulated blast furnace slag is used.

5. Method according to claim 1, wherein the method is carried out at ambient temperature.

6. Method according to claim 1, wherein the absorbent used is cellulose, in the absence or presence of an organo-clay compound.

* * * * *